United States Patent [19]

McColl

[11] 4,237,994
[45] Dec. 9, 1980

[54] INDEPENDENT STEERING AND PROPULSION SYSTEM FOR OFF ROAD VEHICLE

[75] Inventor: Bruce J. McColl, Whitby, Canada

[73] Assignee: Owens-Illinois, Inc., Toledo, Ohio

[21] Appl. No.: 934,457

[22] Filed: Aug. 17, 1978

Related U.S. Application Data

[63] Continuation-in-part of Ser. No. 842,801, Oct. 17, 1977, Pat. No. 4,153,265.

[51] Int. Cl.³ .................. B62D 61/10; B62D 5/04
[52] U.S. Cl. ........................... 180/179; 180/24
[58] Field of Search ............ 180/170, 178, 179, 167, 180/168, 199, 21, 24, 22, 23, 24.05, 24.06, 24.07, 233, 234, 242, 243, 252, 253, 65 R, 65 F, 140, 141, 142, 143; 188/5; 318/580, 567

[56] References Cited

U.S. PATENT DOCUMENTS

| | | | |
|---|---|---|---|
| 3,011,579 | 12/1961 | Milliken | 180/141 |
| 3,280,931 | 8/1966 | Cahill | 180/140 |
| 3,387,684 | 6/1968 | Belke | 180/140 |
| 3,856,102 | 12/1974 | Queen | 180/140 |
| 3,887,239 | 6/1975 | Engle | 303/21 B |
| 3,903,979 | 9/1975 | Perrotin | 180/140 |
| 3,933,215 | 1/1976 | Scheuerle | 180/79.1 |
| 3,939,938 | 2/1976 | Inoue | 91/380 |
| 3,941,202 | 2/1976 | Sorkin | 104/152 |
| 3,941,203 | 3/1976 | Leconte | 123/102 |
| 4,042,059 | 8/1977 | Bertolasi | 180/79.1 |
| 4,090,581 | 5/1978 | Miner | 180/140 |

*Primary Examiner*—John J. Love
*Assistant Examiner*—Randall A. Schrecengost

*Attorney, Agent, or Firm*—John R. Nelson; Myron E. Click; David H. Wilson

[57] ABSTRACT

A high mobility wheeled vehicle for transporting long loads, such as trimmed tree trunks or whole trees, over roadless terrain. The vehicle has front and rear quad wheel assemblies pivotally connected to a centrally disposed elongated bed frame so as to permit lateral rotation of these assemblies about a roll axis disposed below and parallel to the longitudinal axis of the bed frame. A linkage type roll control interconnects the quad wheel assemblies and the bed frame to proportionately control the relative angular movement of the bed frame with respect to the quad wheel assemblies. The roll control includes a plurality of interconnected links plus a pair of power extensible links for selectively adjusting the steady state position of the vehicle bed relative to the quad wheel assemblies in either direction.

The quad wheel assembly incorporates a unique mounting for each of the wheels of the assembly which provides for individually controlled motors for driving each wheel, individually controlled brakes, and individually controlled, power actuated extensible links for steering each wheel. Sensors are provided on each wheel assembly which generate signals proportional to the rotational velocity and direction of the wheel and proportional to the turning angle of each wheel. A microprocessor receives all such signals and compares same with a desired turning angle and rotational velocity of the wheels in accordance with one of a plurality of modes of operation of the vehicle selected by the operator, and generates appropriate control signals to the individually controlled wheels to adjust the turning motion and the rotational velocity to that required to effect the desired movement of the vehicle.

8 Claims, 23 Drawing Figures

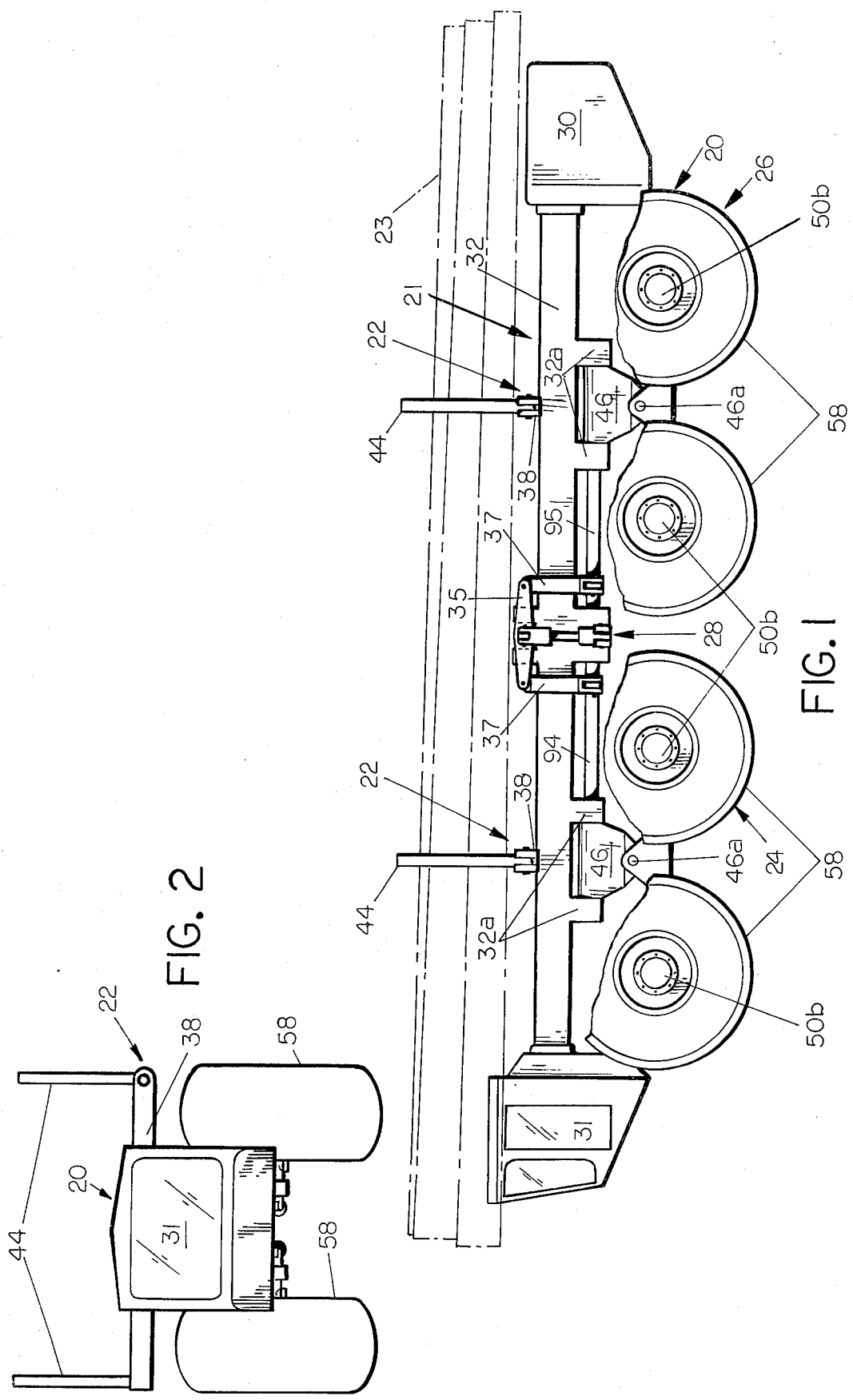

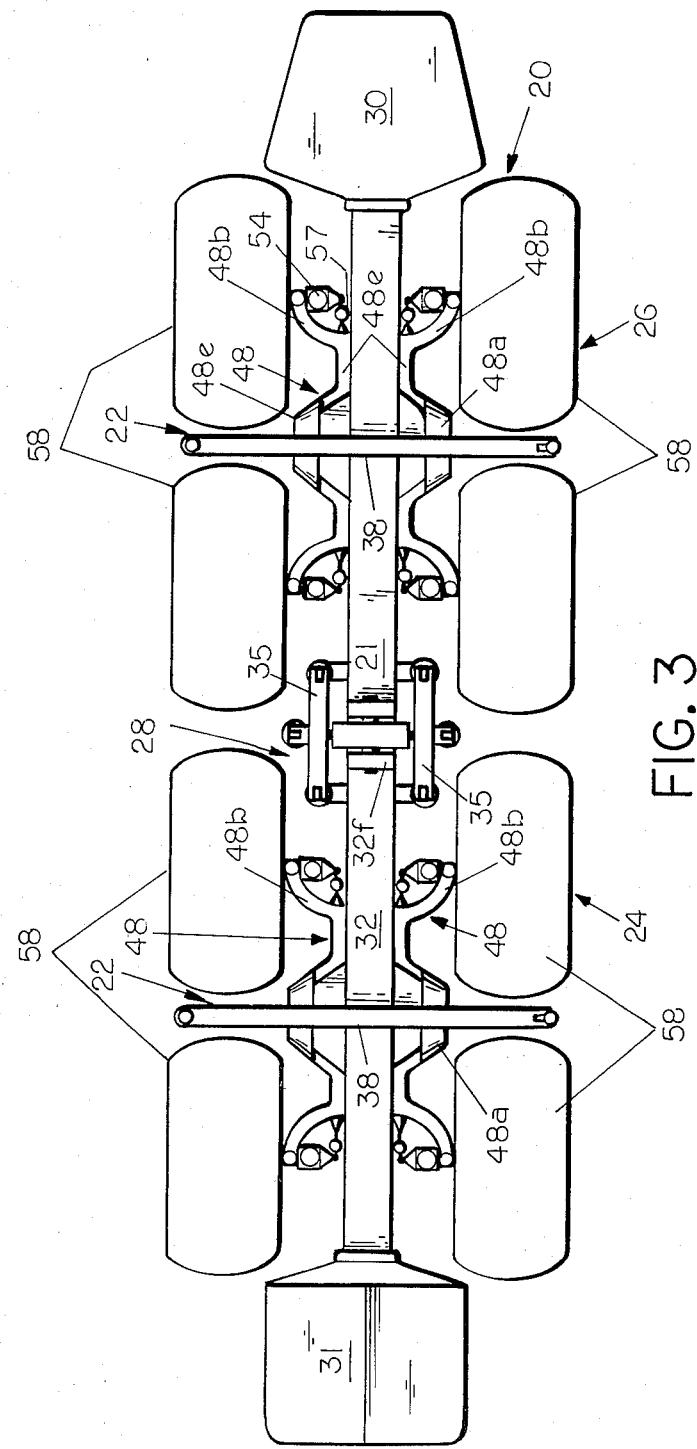

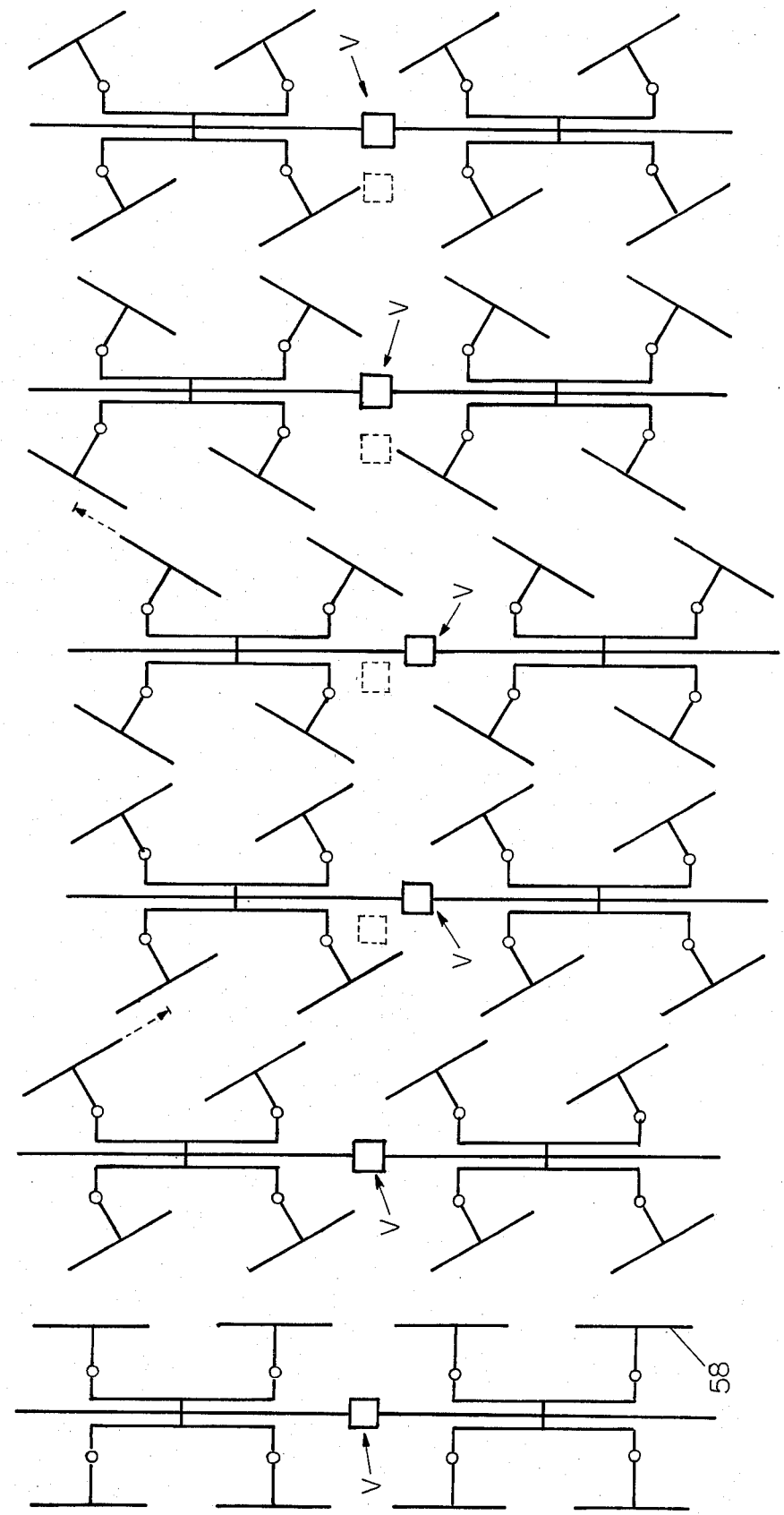

INDEPENDENT STEERING AND PROPULSION SYSTEM FOR OFF ROAD VEHICLE

CROSS REFERENCE TO RELATED APPLICATIONS

This application constitutes a continuation-in-part of my co-pending application Ser. No. 842,801 filed Oct. 17, 1977, now U.S. Pat. No. 4,153,265.

Certain of the structure disclosed in this application is disclosed and claimed in my co-pending application Ser. Nos. 934,458 and 934,459 filed concurrently herewith.

SUMMARY OF THE INVENTION

Generally speaking, this invention relates to self-propelled vehicles used primarily to transport long loads across roadless terrain. More specifically, it relates to rubber tired vehicles that have wheel suspension mechanisms which provide balanced weight between its wheels and additionally permits adjustment of the steady state position of the main bed frame of the vehicle relative to a longitudinal roll axis to permit compensation for the vehicle position when operating continuously on the side of a hill, and also to facilitate unloading of the vehicle by a side dumping action in either direction.

In summary, the vehicle comprises an elongated bed frame that forms the backbone of the vehicle. This frame is balanced on the central portion of modular front and rear wheel assemblies, preferably each having four quadrilaterally spaced wheels. The quad wheel suspension system is designed to provide a freedom of movement of each wheel about mutually perpendicular roll and pitch axes that are vertically spaced one above the other. The quad wheel assemblies are pivotally mounted on the bed so as to be movable about a roll axis which is parallel to and beneath the longitudinal axis of the main frame element. On the lower or pitch axis of each quad wheel assembly, two walking beam members, each carrying a pair of steerable wheels, are rockably mounted in a balanced relationship. Thus the walking beams may rock about the pitch axis of the quad wheel assembly while the quad wheel assembly itself may pivot about the roll axis. A mechanical interconnection comprises a pair of tubular torque transmission members that extend from one quad wheel assembly toward the other and are interconnected by a novel linkage system which continuously adjusts the position of the longitudinal bed frame about the roll axis to lie intermediate the positions of the quad wheel assemblies. Additionally, the linkage incorporates two power extensible links by which the steady state position of the longitudinal bed frame member relative to the roll axis may be selectively determined by the operator.

In accordance with the invention specifically disclosed and claimed in my aforementioned co-pending application Ser. No. 934,458, a unique mounting of each wheel with respect to the walking beam member permits a driving motor and brake to be incorporated in the wheel mounting mechanism for imparting required rotational movements to the wheel and, additionally, an electrical or hydraulic actuator is also incorporated in the mounting to impart individually controlled steering movements to the particular wheel. Additionally, sensors are provided which generate signals respectively proportional to the rotational velocity of the wheel and to the angle of turn of the particular wheel. These sensor signals are inputs to a microprocessor and are compared with the turning position and rotational velocity of the wheel required to effect a particular attitude and movement of the vehicle, and compensating signals are then fed to the driving motor for the wheel and the turning actuator to cause the wheel velocity and wheel position to correspond to that required to effect a desired attitude of the vehicle.

A vehicle equipped with this combination of features has numerous advantages over prior art off-road vehicles. The individual control of the velocity and the turning angle of each wheel permits the vehicle to be manipulated through any selected one of a plurality of unusual movements or attitudes, most of which are completely incapable of accomplishment by any vehicle equipped with conventional driving and steering mechanisms. The vehicle can, of course, proceed in a straight line, either forwardly or rearwardly. The microprocessor can be programmed to cause the vehicle to turn according to the Ackerman principle which governs the turning of most conventional vehicles, but here the individual control of the rotational velocity and turning angle of each wheel permits a precise Ackerman turn to be accomplished. All wheels of the vehicle can be simultaneously turned a fixed number of degrees to cause the vehicle to bodily move in a path angularly disposed with respect to its longitudinal axis. If the vehicle is operating on a steep hillside, under treacherous conditions, a number of opposed wheels of the vehicle can be turned at an angle opposing further movement in the direction of the hill slope and thus providing a very effective braking of the vehicle. By following a predetermined sequence of rotational, braking and turning movements of each wheel of the vehicle, it is possible to achieve a bodily lateral displacement of the vehicle when by some misfortune it gets into a position on the rough terrain where it can neither move forwardly or rearwardly. Similarly, when the vehicle is mired in a bog or hung up on an obstacle such as a high stump or a boulder, a series of turning movements of pairs of the wheels can result in a bodily longitudinal displacement of the vehicle. It necessarily follows that the ultimate flexibility of movement of the vehicle is provided by the methods and apparatus of this invention.

Other advantages and objects will become more apparent when the following description is read with reference to the accompanying drawings.

BRIEF DESCRIPTION OF DRAWINGS

FIG. 1 is a side elevational view of a complete vehicle embodying the wheel suspension mechanism of this invention.

FIG. 2 is a front elevational view of the vehicle of FIG. 1.

FIG. 3 is a plan view of the vehicle of FIG. 1.

FIGS. 14a–14f schematically illustrate a modified form of lateral shift operation employing recurring cycles of skewed movements.

DETAILED DESCRIPTION OF INVENTION

Figure 4:
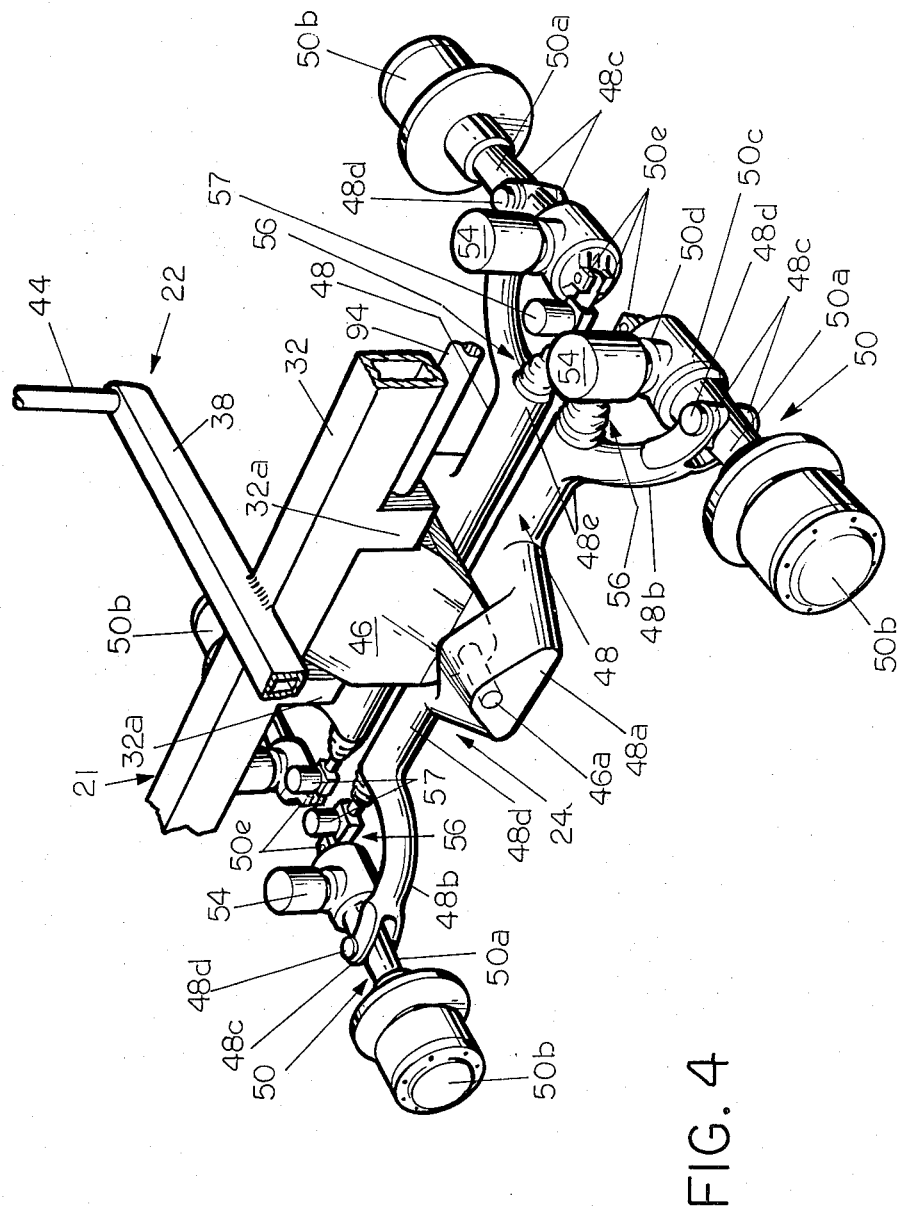
FIG. 4 is an enlarged partial perspective view of the suspension mechanism for the quad wheel assemblies utilized in the vehicle of FIG. 1.

The vehicle illustrated in the drawings is a transportation vehicle such as one used for forwarding tree lengths from a harvesting area in a forest to a landing adjacent to a road. Referring particularly to FIGS. 1–3 of the drawings, it will be seen that the vehicle 20 is comprised of an elongated bed frame assembly 21 including load-carrying cradle assemblies 22 adapted to carry a plurality of tree lengths 23. Front and rear quad wheel assemblies 24, 26 are respectively attached to the bed frame assembly 21 by journals so as to be pivotally movable about a longitudinal roll axis disposed parallel to and beneath the bed frame assembly 21. A roll control linkage means 28 interconnects the quad wheel assemblies with each other and with the elongated bed frame assembly so as to control their relative positions during operation over rough terrain. Preferably an engine unit 30 is located at the rear end of the vehicle, and an operator's cab 31 is located at the front end.

The illustrated bed frame assembly 21 comprises an elongated bed frame element 32 extending lengthwise along the center line of the assembly. The bed frame 32 which serves as the backbone of the vehicle may be a rectangular tube. A plurality of rigid bed cross beams 38 extend laterally outwardly from the bed frame structure in both directions to form the load-carrying cradles 22. Upright side stakes 44 may be provided on the outer ends of the cross beams. The stakes, along one or both sides, may be releasably mounted to permit sidewise dumping of the load on either side by appropriately tilting the bed frame assembly 21 about the roll axis of the wheel suspension assemblies.

In the drawings it will be noted that the front and rear quad wheel assemblies 24, 26 are substantially identical to one another, so for the sake of brevity, the similar portions will be described with respect to one of them only. Accordingly, attention is directed to FIG. 4 of the drawings wherein the details of the front quad wheel assembly 24 are illustrated.

The suspension system for the front quad wheel assembly includes a main pivot block 46 which is pivotally suspended beneath the tubular bed frame 32 between a pair of depending blocks 32a, thus providing pivotal movement about a longitudinal horizontal roll axis which is parallel to and slightly below the axis of the tubular bedframe 32. Such pivotal mounting is not shown but is entirely conventional. A torque transmission tube 94 extends rearwardly from the main pivot block 46 and is co-movable therewith about the vehicle roll axis. A similar tube 95 extends forwardly from the rear quad wheel assembly and the adjacent ends of tubes 94 and 95 are respectively interconnected by a roll control linkage mechanism 28 to be hereinafter described.

The bottom portion of main pivot block 46 is provided with a pair of laterally projecting horizontal pivot pins 46a which respectively provide pivotal mounting for a pair of walking beams 48 which are of identical configuration except that they are mounted in reversed positions on the pivot pins 46a. Each walking beam 48 is of a generally truncated W-shaped configuration in plan view including a central truncated V-shaped portion 48a defining the bearing for the pivotal mounting on pin 46a and identical angularly disposed arcuate end elements 48b which provide mountings for steerable wheel units 58 of the quad wheel assemblies. The ends of arm portions 48b are bifurcated as indicated at 48c and the bifurcated ends are traversed by a vertical pivot unit 48d which pivotally supports a central cylindrical portion 50a of wheel spindle or drive housing 50. At its outer end, the axle housing 50 terminates in a power driven cylindrical hub 50b to which a wheel 58 is rigidly secured in conventional fashion. The inner end of housing 50 defines a gear chamber 50c plus a mounting flange 50d for mounting an electrically or hydraulically driven reversible motor 54 by which the wheel 58 is driven. The gearing mechanism interconnecting the reversible motor 54 with the wheel hub 50b may be entirely conventional and need not be described in detail. The extreme inner end of wheel mounting housing 50 is provided with a pair of bifurcated lugs 50e which pivotally mount the apertured end of a steering actuator 56. The other end of actuator 56 is pivotally mounted to the bottom portion 48e of the truncated W-shaped walking beam 48. While actuator 56 may be hydraulically operated, I prefer to employ an electrically driven actuator and hence an actuator motor 57 is mounted on the actuator 56 and effects the extension or retraction of actuator 56 to in turn effect a steering motion of the associated wheel 58.

Within housing 50, a suitable power actuated brake (not shown) is also provided.

From the description thus far, it should be apparent that the steering movements of the wheels 58 about the respective steering pin units 48d involve a much larger turning radius, from one to four feet, depending on the size of the vehicle, than is customarily employed in wheeled vehicles. As will be described, this large turning radius is of significant advantage in effecting either a longitudinal or a lateral bodily displacement of the entire vehicle through the combination of limited steering, braking and rotational movements of the wheels in a selected sequence. Obviously, both the wheel driving motors 54 and the steering actuator motors 57 must have sufficient power to effect the desired rotation of the wheels and steering of the wheels under the very adverse conditions encountered in off-road operations. Such power may be supplied from a generator (not shown) driven by the engine 30.

From the description thus far, it is also apparent that each quad wheel assembly 24, 26 is suspended relative to the main bed frame element 32 in such fashion that the bed frame may pivot relative to the quad wheel assemblies about a roll axis which is parallel to and slightly beneath the main bed frame element 32. Concurrently, the wheels on each side of the quad wheel assembly may freely move in a vertical plane about a horizontal pivot axis defined by the walking beam pivot pin 46a. Moreover, due to the "W" shape of each walking beam 48, steering movements of each of the wheels up to a thirty degree (30°) angle may be accomplished in either direction without interference with the suspension, the main frame or load carrying cradles of the vehicle.

The relative angular movement of the quad wheel assemblies 24, 26 with respect to each other and to the elongated bed frame assembly 21 is regulated by a roll control linkage 28, centrally located on the vehicle, that causes equal loading to be imposed on each quad wheel assembly, and also causes the bed frame assembly to be rotated proportionately, preferably one half the total angular displacement between the front and rear quad wheel assemblies, as exists at any one time. Angular displacement between the quad wheel assemblies relative to the roll axis obviously occurs during operation on uneven terrain or over boulders. The ground under the front quad wheel assembly may be laterally and possibly oppositely inclined to the ground under the rear quad wheel assembly, such as might occur while the vehicle is traversing a ditch at an angle.

Figure 5:
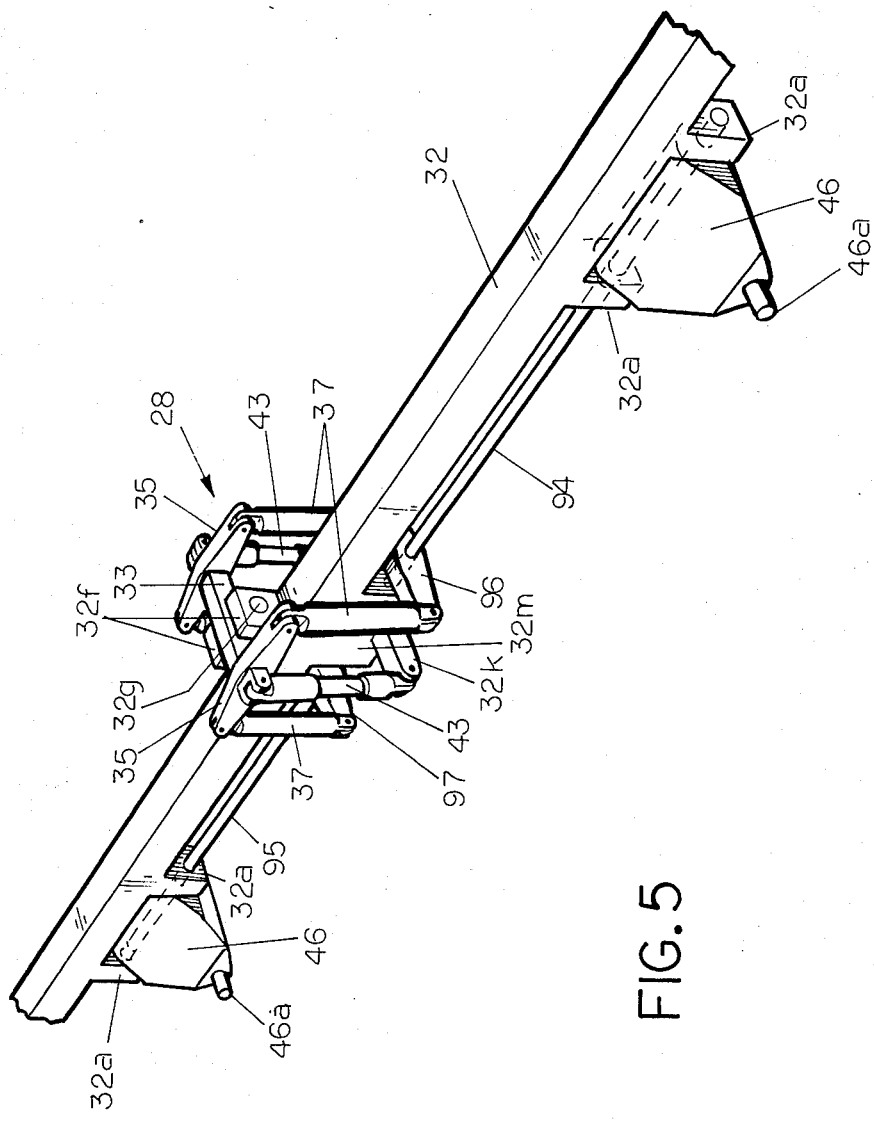
FIG. 5 is an enlarged partial perspective view illustrating the roll control linkage for the wheel suspensions incorporated in the vehicle of FIG. 1.

Referring now to FIG. 5, the roll control linkage 28 will be described in greater detail. The rearward end of torque tube 94 and the forward end of torque tube 95 are suitably journaled in a depending frame block 32m and are disposed in spaced coaxially aligned relationship approximately in the center of the elongated frame member 32. Immediately above and between the ends of the torque tubes 94, 95, the base member 32 is provided with a pair of upstanding pivot ears 32f which support a pivot pin 32g which traverses the center portion of a transverse frame tilt lever 33. On each end of frame tilt lever 33 a longitudinal connecting lever 35 is mounted for pivotal movement about a horizontal axis. Additionally, on each end of torque tubes 94 and 95 there are respectively rigidly secured primary transverse actuating levers 96 and 97 and the ends of these levers are in general vertical alignment respectively with the ends of the connecting levers 35. A plurality of links 37 are provided respectively having their ends connected by a universal joint connection to the aligned ends of primary levers 96 and 97 and the connecting levers 35. Thus, any pivotal movement of one of the quad wheel assemblies 24, 26 relative to the other will result in a pivoting movement of the associated primary lever 96, 97 which in turn effects a tilting movement of the main tilt control lever 33 to shift the position of the main frame 32 approximately one half the amount of pivotal displacement of the quad wheel assembly relative to the roll axis. Thus a very effective control of the movements of the main frame about the roll axis in response to much larger movements of the quad wheel assemblies is achieved and, in effect, the pivoted lever connection control means 28 provides for balancing the effects of rotations of the two quad wheel assemblies in opposite directions about the roll axis on the main frame assembly.

Concurrently the roll control linkage effects a transfer of forces between the two quad wheel assemblies to equalize the loading thereof during movements about the roll axis.

A further feature of this vehicle suspension is the addition to the roll control lever assemblage 28 of a pair of power actuated stabilizing links which permit the operator to adjust the static position of the tubular main frame 32 relative to the roll axis. Referring to FIG. 5, such links may comprise the power actuated extensible elements 43 which are respectively connected between the extreme ends of the tilt control lever 33 and the bifurcated ends of lateral projections 32k, formed on the depending block 32m, provided on the underside of the tubular bed frame 32. As the one stabilizing link 43 is extended by the application of either hydraulic or electric power thereto, the other link 43 is retracted so that the net effect is that the bed frame 32 and the load supporting cradles or cross-beams 38 are shifted angularly with respect about the roll axis. Thus, the load may be maintained in a substantially horizontal position, even though the vehicle is being operated continuously on a hillside. This capability for adjusting the static angular position of the load carrying cradles relative to the roll axis provides additional stability to the vehicle and hence permits larger loads to be safely carried along a relatively steep hillside.

An extreme extension of either link 43 can effect the dumping of the load on a selected side of the vehicle.

The method and apparatus for individually controlling the direction and speed of rotation of each wheel and the turn angle will not be described. Referring to the control circuits schematically illustrated in FIG. 6, it will be noted that sensors are incorporated within the wheel driving mechanism in conventional fashion so as to provide an electrical signal proportional to the direction and velocity of rotation of the respective wheel. Similarly, a turn angle sensor is incorporated in the steering linkage for each wheel to continuously generate a signal proportional to the turning angle of such wheel. Since these sensors are completely conventional, they are not shown in detail.

Figure 6:
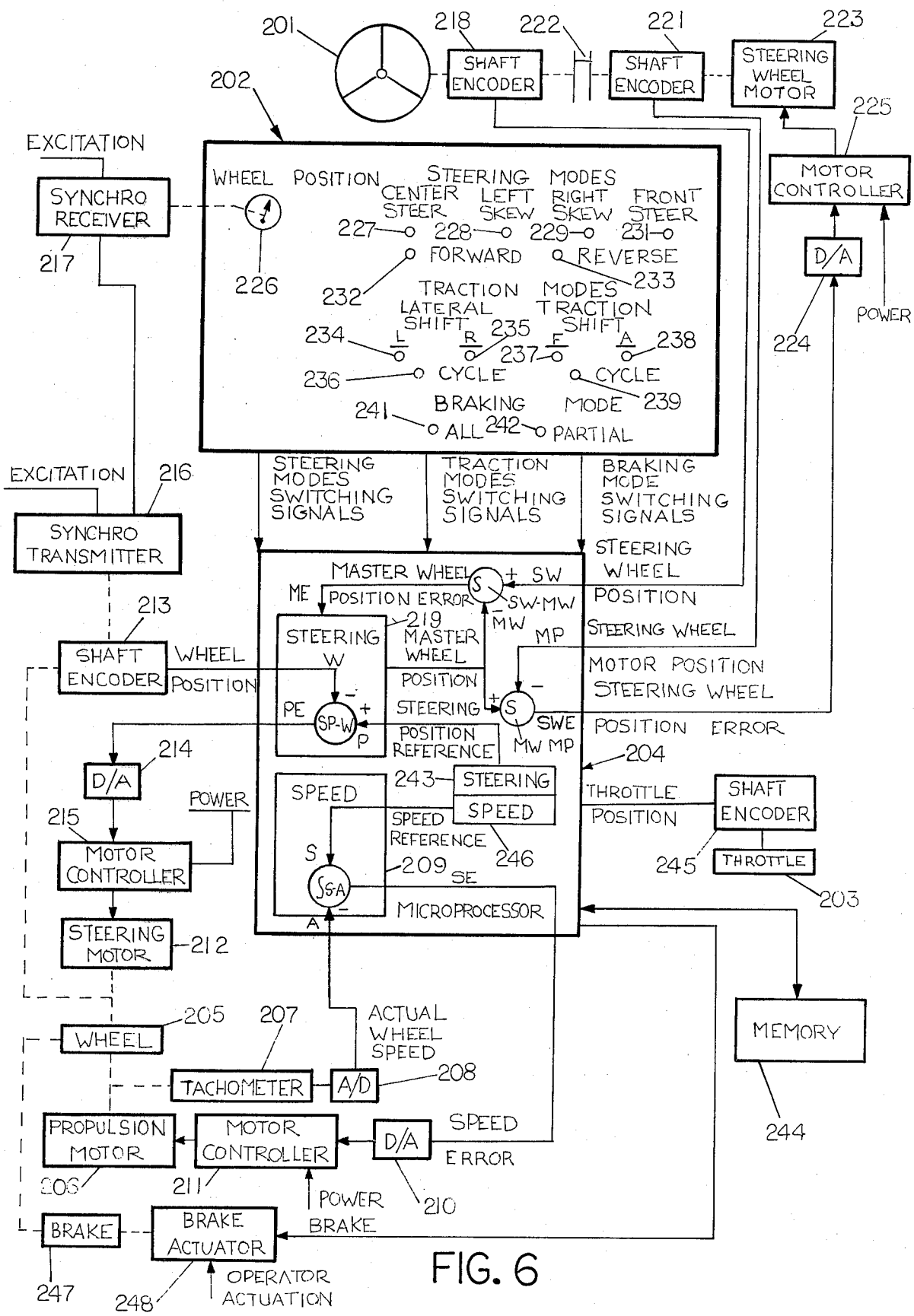
FIG. 6 is a block diagram of the control system embodying this invention.

There is shown in FIG. 6 a propulsion and steering control system for controlling the direction, speed of rotation and turn angle for each wheel of the vehicle. There is provided for the operator a steering wheel 201, a control panel 202 and a throttle or speed selector 203. Information with respect to the positions of the steering wheel 201 and the speed selector 203 is provided to a microprocessor 204 to control respectively the turn angle of the vehicle and the speed of the vehicle. The control panel generates information to the microprocessor concerning the desired steering, rotational speed and braking condition of each wheel of the vehicle to accomplish a desired movement or attitude of the vehicle. The microprocessor uses the inputted information to generate control signals to a propulsion motor, brake and a steering motor for each of the wheels of the vehicle.

There is shown a wheel 205 which represents any one of the eight vehicle wheels. The wheel 205 is mechanically coupled to a propulsion motor 206 which controls the direction and speed of rotation of the wheel. The propulsion motor 206 corresponds to the reversible motor 54 shown in FIG. 4. A tachometer 207 is mechanically coupled to the propulsion motor 206 to generate a speed signal having a polarity which represents the direction of rotation of the wheel and a magnitude which represents the speed of rotation of the wheel. The tachometer 207 could be replaced by a pair of sensors, one of which generates a signal representing the direction of rotation and the other of which generates a signal representing the speed of rotation of the wheel. The output signal generated by the tachometer 207 is converted from analog to digital form by an analog-to-digital converter 208 and generated as a digital actual wheel speed signal to the microprocessor 204.

The microprocessor 204 program has a speed program portion 209 to integrate the difference between a speed reference signal S and the actual speed signal A to generate a speed error signal SE to a digital-to-analog converter 210. The converter 210 generates an analog speed error signal to a motor controller 211 which receives power from a source (not shown) to control the speed and direction of rotation of the propulsion motor 206.

The wheel 205 is also mechanically coupled to a steering motor 212 which controls the turn angle of the wheel. A shaft encoder 213 is mechanically coupled to the steering motor 212 output shaft to generate a signal indicating the wheel position for the wheel 205 to the microprocessor 204. The microprocessor 24 is programmed to integrate the difference between a steering position reference signal P and the wheel position signal W from the shaft encoder 213 to generate a steering position error signal PE to a digital-to-analog converter 214. The converter 214 generates an analog output signal to a motor controller 215 which receives power from a source (not shown) to control the steering motor 212 to determine the turn angle of the wheel 205. The motor 212 corresponds to the actuator motor 57 of FIG. 4. A synchro transmitter 216 is mechanically coupled to the shaft encoder 213 and receives an excitation signal from a source (not shown) to generate a wheel position signal to a synchro receiver 217 to provide an indication of the turn angle of the wheel 205 to the operator of the vehicle as will be discussed. The elements 205-209 and 211-217 are duplicated for each of the eight vehicle wheels but are not shown in FIG. 6 in order to simplify the schematic.

When the vehicle is in one of the steering modes, a selected one of the front or rear wheels is designated as the master wheel for the purpose of providing a reference for the steering system. A shaft encoder 218 is mechanically coupled to the steering wheel 201 to generate a steering wheel position signal SW to the microprocessor 204. The microprocessor 204 selects as the master wheel, the wheel at the corner in the direction of travel and the direction of the turn. Thus, in a forward direction of travel and a front steer steering mode, the right front wheel becomes the master wheel. The wheel position signal W for the right front wheel is one of the inputs to the steering program 219 of the microprocessor program. This wheel position signal is outputted from the steering program 219 as a master wheel position signal MW. The microprocessor 204 is programmed to integrate the difference between the steering wheel position signal Sw from the shaft encoder 128 and the master wheel position signal MW from the steering program 219 to generate a master wheel position error signal ME to the steering program 219. The steering program 219 substitutes the master wheel error signal ME for the steering position error signal PE for the selected master wheel. Thus, the master wheel is being controlled in accordance with the steering wheel position while each of the other wheels is being controlled in accordance with an associated steering position reference signal, the generation of which will be discussed below.

A second shaft encoder 221 is mechanically coupled to the first shaft encoder 218 by a spring coupling 222. The spring coupling 222 allows the steering wheel 201 to be turned a small distance to the right or left and be automatically returned to the center position when the steering wheel 201 is released when no steering motion is desired. The shaft encoder 221 is mechanically coupled to a steering wheel motor 223 to generate a steering wheel motor position signal MP to the microprocessor 204. The microprocessor 204 is programmed to generate a steering wheel position error signal SWE which is the integral of the difference between the master wheel position signal MW and the steering wheel motor position signal MP. This steering wheel position error signal SWE is generated to a digital-to-analog converter 224 which generates an analog control signal to a motor controller 225 which receives power from a source (not shown) to control the position of the steering wheel motor 223. Thus, if the steering wheel 201 is turned and maintained in that position, the microprocessor 204 will generate the master wheel position error signal ME to turn the wheel which is selected as the master wheel to change the value of the wheel position signal W generated by the corresponding shaft encoder similar to the shaft encoder 213. The microprocessor 204 responds to the change in the wheel position signal W to change the steering wheel position error signal SWE thus effecting the rotation of the steering wheel motor 223. The steering wheel motor 223 rotates to a position corresponding to the position of the steering wheel 201. The rate of turning of the steering wheel motor 223 will be proportional to the force exerted by the operator on the steering wheel 201. Thus, the steering feedback circuit is a human engineering feature which provides the operator a feel for the position and rate of steering of the vehicle. This steering feedback feature can also be utilized when the system is in one of the traction modes. The microprocessor can generate its own master wheel position error signal ME such that the position of the steering wheel is automatically changed to correspond to the controlled position of the master wheel.

The operator control panel 202 is utilized for displaying wheel position information and generating switching signals to control the operation of the wheels. Each wheel position signal from the corresponding synchro transmitter is an input to a synchro receiver which is coupled to a wheel position display device. For example, the wheel position signal from the synchro transmitter 216 is an input to the synchro receiver 217 which receives its excitation from a source (not shown). The synchro receiver 217 is coupled to an appropriate display device 226 which indicates the wheel position of the corresponding wheel 205. Although not shown, each wheel may be similarly coupled to a display device on the control panel 202.

The control panel 202 also includes controls for the steering modes, traction modes and the braking mode operation of the vehicle. Each of these steering modes is selected through the actuation of a control button such as a push button 227 for selecting an Ackerman steering mode with a center to the right or left of the vehicle (FIG. 10); a push button 231 for selecting a modified Ackerman steering mode about a center laterally spaced from the rear or front of the vehicle (FIG. 11); a push button 228 for selecting a right skew steering mode (FIG. 12); and a push button 229 for selecting a left skew steering mode (not shown). The vehicle can be operated in either the forward or reverse direction in each of the steering modes and a push button 232 is provided for selecting the forward direction of travel while a push button 233 is provided for selecting the reverse direction of travel. The vehicle can also be operated in either of two traction modes which are a lateral shift and a traction shift and respectively produce a bodily lateral movement of the vehicle and a bodily longitudinal movement (FIGS. 7a, 7b, 7c, 8a and 8b). The lateral shift mode is performed in either the left direction by actuating a push button 234 or in the right direction by actuating push button 235. After the direction of shift is selected, a push button 236 is actuated to initiate the automatic cycling of the lateral shift mode. In the traction shift mode, either a forward shift can be selected by actuating a push button 237 or an aft shift can be selected by actuating a push button 238. After the traction shift direction has been selected, a push button 239 can be actuated to initiate automatic cycling in the traction shift mode. In the braking mode, (FIGS. 9a and 9b) the actuation of a push button 241 will automatically brake all of the vehicle wheels and the actuation of a push button 242 will automatically brake a programmed selected number of all of the wheels. The operation of the vehicle in each of the steering, traction and braking modes will be discussed below.

The steering mode switching signals, the traction mode switching signals and the braking mode switching signals, generated by the actuation of selected push buttons on the control panel 202, are inputs to the microprocessor 204. In any of the steering modes of operation, the steering mode switching signals provide information to a steering program portion 243 of the program in the microprocessor 204. The steering program 243 generates a steering position reference signal P for each of the seven wheels not selected as the master wheel. These steering position reference signals can be generated either by entering the turn angle of the master wheel into an equation to generate the position reference values for each of the other seven wheels or by selecting the position reference value in accordance with the turn angle of the master wheel from a set of data stored in a memory 224. The memory 244 can be included in the microprocessor 204 or can be a separate element coupled to the microprocessor 204 to generate data in response to control signals. In either case, a new set of seven steering position reference signals will be generated each time the master wheel position changes by a predetermined amount typically equal to the resolution of the shaft encoder 213.

The magnitudes of the speed reference signals S are determined by the position of the speed selector 203 which is mechanically coupled to a shaft encoder 245 to generate a throttle position signal to the microprocessor 204. A speed program portion 246 of the program of the microprocessor 204 utilizes the speed selector signal to generate the speed reference signal S for the master wheel. The speed program 246 then generates a speed reference signal S for each of the wheels in accordance with either an equation in the program or a set of relationships stored in the memory 244. A new set of speed reference signals are generated each time the position of the speed selector 203 changes by a predetermined amount, typically equal to the resolution of the tachometer 207.

Each wheel has an associated brake and all of the brakes are actuated simultaneously by the operator. As shown in FIG. 6, the wheel 205 is mechanically coupled to a brake 247 which in turn is mechanically coupled to an associated brake actuator 248. The brake actuator is normally controlled by the operator from a control means (not shown) which generates as operator actuation signal. This signal can be generated by conventional means such as a hydraulic or electric braking system control. As will be discussed below, when the vehicle is in one of the traction modes of operation, the brake for each of the wheels is automatically cycled. The microprocessor 204 is programmed to respond to the braking mode switching signals to generate an appropriate brake signal to each of the brake actuators, such as the brake actuator 248, to automatically control the vehicle brakes.

In summary the vehicle control system shown in FIG. 6 provides for the operator selection of one of four steering modes, one of two traction modes and one of two braking modes to control the vehicle. In the steering modes, the microprocessor 204 is responsive to the position of the steering wheel 201 to control the turn angle of the selected master wheel and the turn angle of each of the other wheels in accordance with the turn angle of the master wheel. The relative speed of each wheel is also automatically controlled by the microprocessor 204 and the absolute speeds in accordance with the position of the speed selector 203 and, when the vehicle is in a steering mode, in accordance with the turn angle relationship of the other wheels to the master wheel. The microprocessor 204 is programmed to either solve equations for the steering position reference signals and the speed reference signals or to select the values for these signals from data stored in the memory 244. It will be apparent from the succeeding discussions of the operational modes of the vehicle that in some modes a symmetry exists such that more than one wheel can be controlled with the same steering position error signal or the same speed error signal. These situations can be taken into account to reduce the size of the memory 244 where the equations are stored or the stored data approach is taken to generating the steering position reference and speed reference signals. It will also be apparent that the microprocessor 204 can be replaced by a plurality of microprocessors including one for each wheel in order to decrease the response time of the system to a change in any mode of operation, turn angle and/or vehicle speed. Furthermore, although the wheel speed and steering position for each wheel is controlled in accordance with the integral of the difference between a referance signal and an actual value signal, such control could be in addition proportional or differential in accordance with well-known control techniques.

OPERATIONAL MODES

Figure 10:
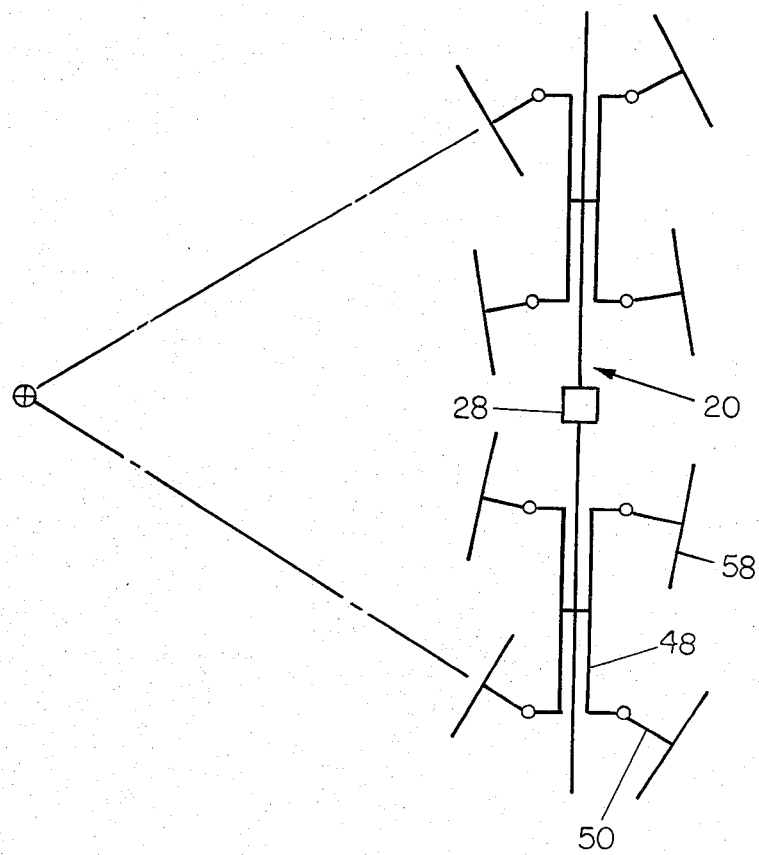
FIG. 10 is a schematic view illustrating an Ackerman steering mode of a vehicle with the steering center located along a line that is perpendicular to the vehicle longitudinal axis and passes through the center of the vehicle.
Figure 11:
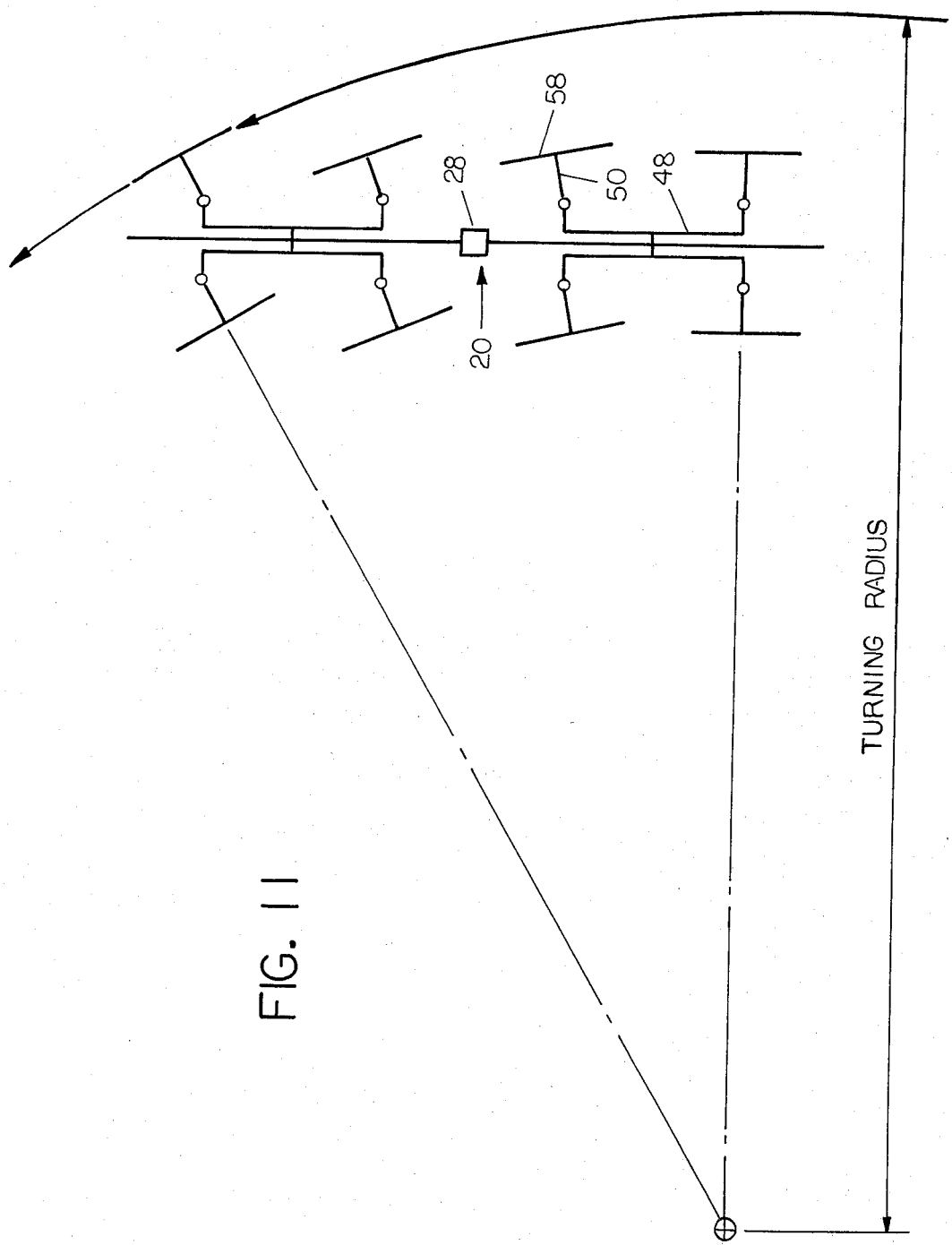
FIG. 11 schematically illustrates a modified Ackerman steering mode about a center located at the rear of the vehicle on a line perpendicular to the vehicle longitudinal axis and passing through the rear of the vehicle.

If the operator pushes button 227, the vehicle can then be steered in the conventional Ackerman steering mode about a steering center located either to the right or left of the vehicle on a line drawn perpendicular to the vehicle longitudinal axis and through the center of the vehicle (FIG. 10). Actuation of push button 231 selects a modified Ackerman steering mode, with the steering center located at a point laterally spaced on either side of the vehicle but on a line intersecting the vehicle longitudinal axis at either the front or the rear portion of the vehicle (FIG. 11).

Figure 12:
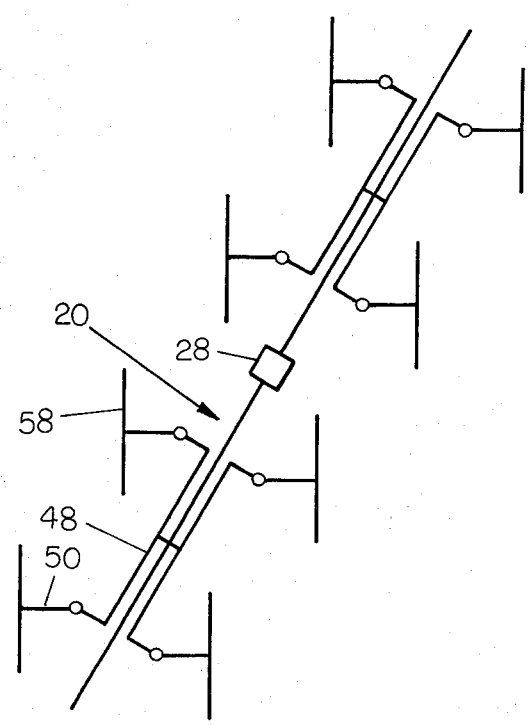
FIG. 12 schematically illustrates a skew steering mode of the vehicle in a right direction.

The actuation of push button 228 selects a right skew steering mode as illustrated in FIG. 12.

Skew steering has long been advocated as a means for permitting multi-wheeled off-road vehicles to avoid obstructions that would be encountered if the vehicle progressed forwardly or rearwardly while making ordinary turns. In skew steering, all of the wheels of the vehicle are concurrently turned in the same direction by the same amount so that when traction forces are applied to the wheels, the vehicle moves along a path which is angularly disposed relative to the longitudinal axis of the vehicle, for example, as illustrated in FIG. 12.

Figure 13:
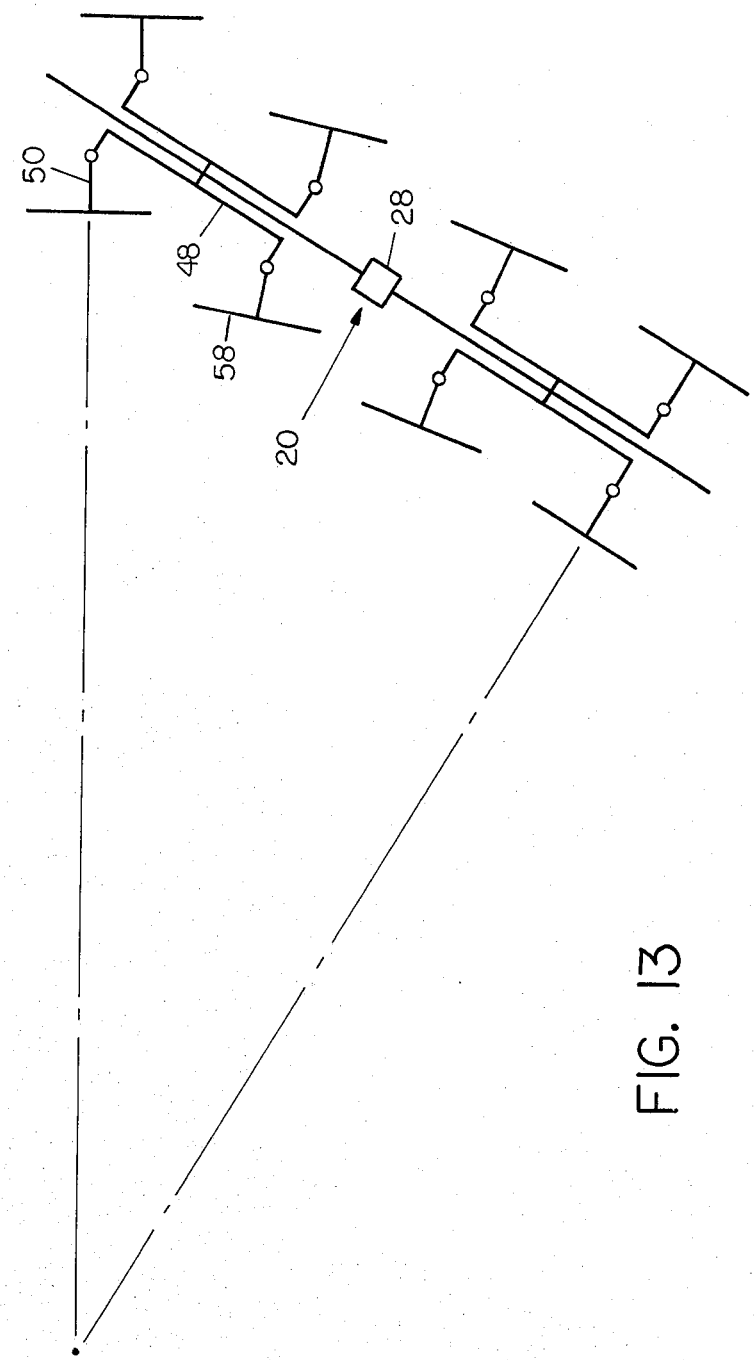
FIG. 13 schematically illustrates the turning of the vehicle while in the skew steering mode.

Assuming that in FIG. 12 the wheels are already turned counter-clockwise to the maximum degree permitted by the steering mechanism, then the utilization of prior art controls for the application of steering and propulsion forces to the vehicle would indicate that the vehicle in FIG. 12 could in no manner be turned to the left if such action were necessary to avoid an obstruction that would be encountered if the vehicle continued on the original skewed path. With the control system of this invention, the vehicle may be readily steered to the left, as illustrated in FIG. 13, by merely selecting either of the rear wheels of the vehicle as the master wheel and then executing an Ackerman turn by those and the other rearward wheels clockwise and thereby achieve a left turn of the vehicle according to the Ackerman principle about a turning point which is located along a line passing through the steering axes of the rear wheels and perpendicular to the longitudinal axis of the vehicle.

At the same time, the vehicle may be steered to the right from the skewed steering mode illustrated in FIG. 12 by merely selecting either of the front wheels as the master wheel and executing an Ackerman-type turn about the turning point located on a line passing through the steering axes of the two front wheels and perpendicular to the longitudinal axis of the vehicle.

It is therefor apparent that a control system embodying this invention provides additional flexibility for skew steering of the vehicle. The same flexibility is provided when button 229 is actuated to select a left skew steering mode (not shown) which permits the vehicle to be steered in either direction in an Ackerman fashion even while the wheels are in the skewed position.

Figure 9B:
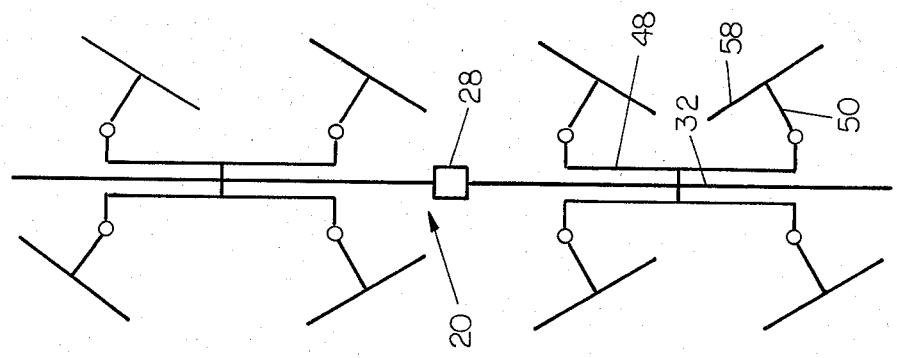
FIGS. 9a and 9b are schematic views illustrating the operation of the vehicle in either of two braking modes.
Figure 9A:
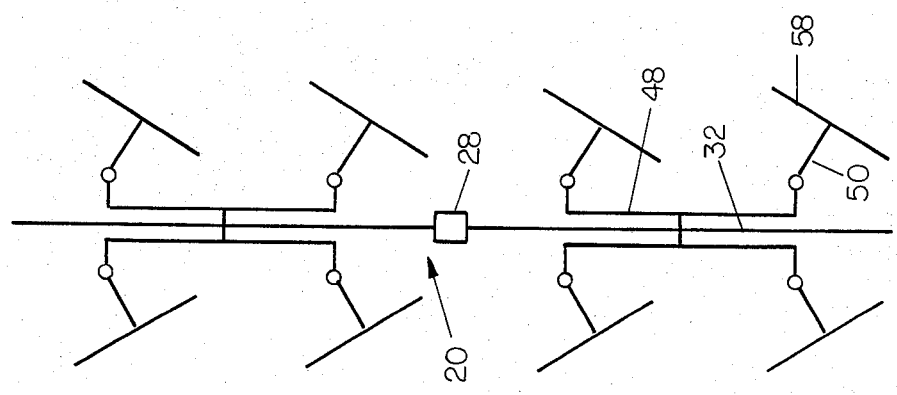

In the braking modes illustrated in FIGS. 9a and 9b, the actuation of push button 241 will cause all of the vehicle wheels to be turned with all wheels on one side turned opposite to those on the other so that the wheels are effectively positioned to block any longitudinal movement of the vehicle as illustrated in FIG. 9a. If it is desired to apply the braking mode only to a selected number of the wheels, for example, the four innermost wheels so as to provide for some degree of steering control of the two ends of the vehicle, then the actuation of push button 242 will effect the simultaneous turning of the four inner wheels, with the wheels on opposite-sides of the vehicle being turned oppositely to their full extent, resulting in the configuration of the FIG. 9b where the vehicle is effectively braked against longitudinal progress by the inner wheels but, if the vehicle continues to move, such as under snow conditions on a steep hillside, steering control may still be exerted by the operator through controlling the forward and rearward pairs of wheels respectively.

Still another advantage of the mechanism and control system for the steering of the vehicle in accordance with the invention is provided by operating the vehicle in a lateral shift mode. By way of background, those skilled in the art will recognize that any vehicle which is capable of skew steering can be laterally shifted by first moving the vehicle along a path representing the maximum skew to the right and then twisting the wheels in place against the restraining forces of the ground on which they are in contact to re-position the wheels in their maximum reversed skewed position and then reversing the direction of travel of the vehicle. The vehicle thus moves in a saw-tooth pattern involving both a longitudinal and a lateral component of motion but the longitudinal component is effectively cancelled out after each complete cycle of the above described two skewed movements.

A lateral shift mode of operation of the vehicle embodying this invention does not require the twisting of all the tires of the vehicle against the ground surface in order to achieve the re-arrangement of the wheels from the maximum right skewed position to the maximum left skewed position. Instead, lateral shift of the vehicle may be accomplished in either of two manners, the first of which is illustrated by FIGS. 7a, 7b, and 7c and the second by FIGS. 14a through 14f.

Figure 7C:
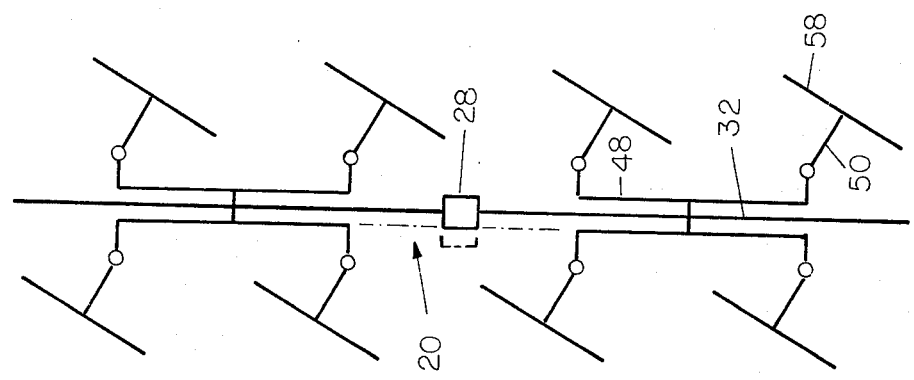
FIGS. 7a, 7b and 7c are schematic diagrams illustrating the lateral shift mode of operation of the vehicle.
Figure 7B:
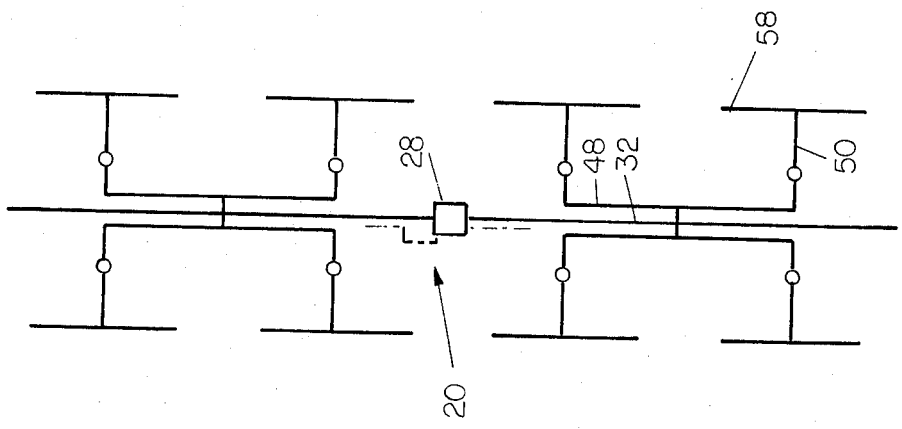
Figure 7A:
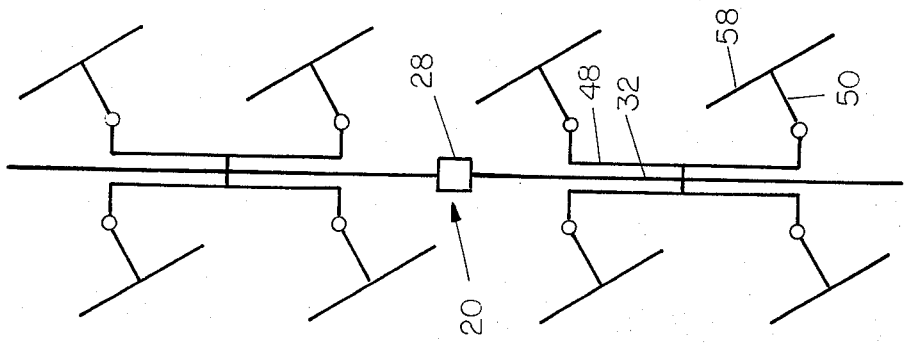

The lateral shift mode of operation schematically illustrated in FIGS. 7a, 7b and 7c is employed when forward or rearward movement of the vehicle is impeded, for example, by boulders or trees, or due to the wheels being mired in a bog and having no traction, so as to prevent any significant forward or rearward movement of the vehicle by wheel rotation. The lateral shift mode of operation is selected by actuating either push button 234 or 235, depending upon whether a shift of the vehicle to the left or right is desired, and then actuation of push button 236 causes the automatic cycling of the wheels of the vehicle by the micro-processor. In this modification, the micro-processor 204 is programmed to first turn all of the wheels on the vehicle to their maximum turned position in either a clockwise or counter-clockwise direction, counter-clockwise being illustrated in FIG. 7a. During this turning movement, the wheels are free to rotate so that if they are in a bog, the turning movement can nevertheless be accomplished, because no reliance is placed on the traction of the wheels against the particular terrain on which they rest.

Once having achieved this position, the automatic sequencing control by the micro-processor 204 applies the brakes to all of the wheels on the side of the vehicle opposite the desired lateral shift direction, here the left side of the vehicle, while at the same time imparting a turning movement to the wheels to turn them to their straight forward position relative to the vehicle, as illustrated in FIG. 7b. Concurrently, all wheels on the right side of the vehicle are turned in the same direction to their straight forward steering position with the wheel rotation unrestrained or with traction power applied to assist such turning, as illustrated in FIG. 7b, resulting in a bodily lateral shift of the vehicle. At this point the automatic sequencing control applied the brakes to the wheels on the side toward which movement is desired, releases the brakes on the opposite side wheels, but continues the clockwise turning movements of all wheels to the extreme position illustrated in FIG. 7c, resulting in more bodily lateral movement.

If additional lateral movement is required, the braking and turning sequence is repeated, but the wheels are now turned in counter-clockwise direction.

In the second form of lateral shift of the vehicle which may be accomplished by utilization of the structure and control system of the invention, the sequence of wheel positions is illustrated by FIGS. 14a through 14f. This second form cannot be utilized in a bog because some degree of wheel traction is required. In FIG. 14a, which is presumed to be the starting position, all of the wheels are parallel to the longitudinal axis of the vehicle. In the first step of the sequence, the wheels on both sides of the vehicle are concurrently traction actuated and turned through the maximum steering angle to assume the positions shown in FIG. 14b. It should be noted that this motion of the wheels does not produce any shift of the body of the vehicle, represented by the block V.

In the next step, all of the opposed pairs of wheels are concurrently rotated by the application of traction power thereto to, in effect, achieve rearward movement of the vehicle according to a skew steering mode. Since it is presumed that the longitudinal freedom of the vehicle is quite limited, this movement is generally on the order of less than a full rotation of the wheel, say from thirty (30) to sixty (60) degrees. The vehicle then assumes the position shown in FIG. 14c wherein the body V of the vehicle has been shifted both laterally to the right and longitudinally rearwardly, assuming that the top of the page represents a forward motion of the vehicle. In this and other views, the dotted square indicates the initial position of the vehicle. From this point, the wheels are turned in the reverse direction with the traction brakes released, and with both traction power and steering power applied, thereby assuming the position shown in FIG. 14d wherein it will be noted that again no lateral or longitudinal movement of the body of the vehicle has been accomplished. The wheels are now positioned for skew steering in the opposite direction than in FIG. 14b and again, traction power is applied to rotate the wheels in a forward direction from thirty to sixty degrees, assuming the position of FIG. 14e, where it will be noted that the body V of the vehicle has been additionally shifted to the right but returned to a longitudinal position slightly forwardly of the initial position of FIG. 14a. Traction power and steering power are then applied to concurrently shift all wheels counter-clockwise to the position shown in FIG. 14f, which again has no effect on the position of the vehicle body V.

At this point the wheel positions are identical to that shown in FIG. 14b and the cycle can be repeated if further lateral shift of the vehicle body is desired.

In the aforedescribed description of the second traction shift mode, and, in fact, in any of the skew steering modes, it is assumed that the steering mechanism for the vehicle is such as to hold the vehicle wheels in a desired steering position, once such position has been selected by the micro-processor. This may be accomplished either by through the utilization of irreversible gearing to effect the steering of the wheels or through the utilization of a brake which is effective to hold the steering mechanism for each wheel in a selected position according to the energization signals received from the micro-processor 204. Such braking action for the steering mechanism is entirely conventional and hence has not been illustrated in the drawings.

It will also be apparent to those skilled in the art that the micro-processor 204 will be programmed to provide either of the two types of traction shift operations heretofor described. The electrical connections for effecting such alternative selection are entirely conventional and have not been illustrated in the drawings.

Figure 8B:
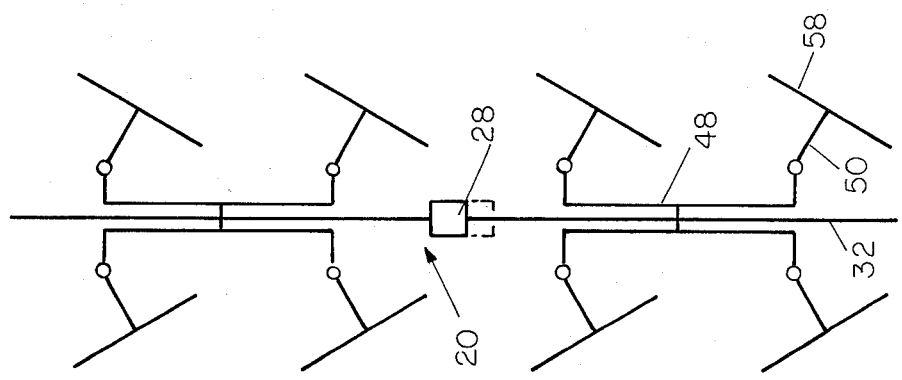
FIGS. 8a and 8b are schematic diagrams illustrating the traction shift mode of operation of the vehicle.
Figure 8A:
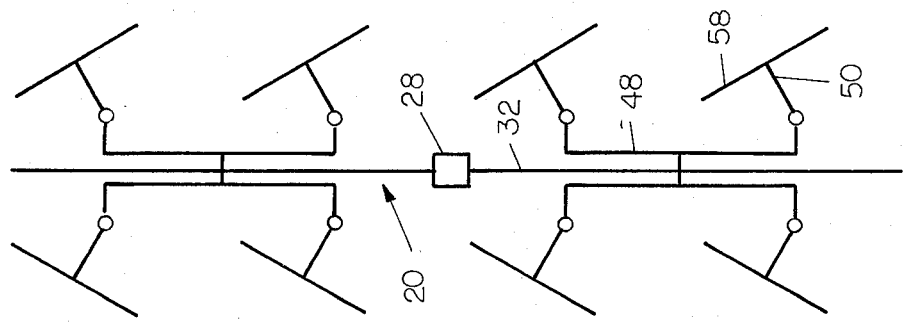

A similar sequencing of braking and turning movements of the wheels may be employed in the traction shift mode, as illustrated in FIGS. 8a and 8b, to effect the forward or rearward bodily movement of the vehicle when ordinary wheel traction cannot supply such or when the vehicle has become immobilized. Such a condition can occur as a result of miring the vehicle in a bog or hanging it up on high stumps or boulders, and usually requires a towing vehicle of similar size to effect a recovery. In the control sequence, which is initiated by actuating push button 237 or button 238, depending upon whether a forward or aft movement of the vehicle is desired, all brakes of the vehicle wheels are applied and all of the wheels are concurrently turned to a toe-in position relative to the vehicle frame with all wheels on one side being turned in the opposite direction to the turning movement of the wheels on the other side as illustrated in FIG. 8a. This motion alone effects a degree of bodily longitudinal shift of the vehicle from its original position. In the next step of the automatic sequencing, opposed pairs of wheels are turned in sequence first one pair and then the next pair, from their position shown in FIG. 8a to their position shown in FIG. 8b but the wheels of each such pair are permitted to freely rotate or with power applied; but no bodily displacement of the vehicle occurs due to the restraining position of the other wheels. The braking and turning cycle can then be repeated, and a further longitudinal shift of the vehicle body is effected.

In any of the aforedescribed movements wherein a limited bodily lateral movement of the wheels relative to the ground would appear to be required, such can be absorbed by flexure of the huge low pressure tires which are mounted on such wheels.

Many modifications of this invention will be apparent to those skilled in the art and it is intended that the scope of the invention be determined solely by the appended claims.

What is claimed is:

1. In a vehicle for traversing roadless terrain having an elongated main frame and front and rear wheel assemblies respectively mounted to said main frame to permit free vertical movements of each wheel to conform to the terrain, the improvement comprising:
   a. means mounting each wheel in the assembly for rotational and steering movements;
   b. a first actuator means for individually rotating each wheel in response to at least a first control signal representing a desired speed of rotation for the associated wheel and sensor means for generating a signal representing the actual speed of rotation of said associated wheel;
   c. a second actuator means for individually controlling the turn angle of each wheel in response to at least a second control signal representing a desired turn angle for the associated wheel and a sensor means for generating a signal representing the actual turn angle of said associated wheel;
   d. a memory means for storing information representing a plurality of modes of operation for the vehicle, each of said modes including information representing a desired direction of rotation, a desired relative speed of rotation and a desired turn angle for each of said wheels; and
   e. control means for selecting one of said modes of operation and for generating said first and second control signals, said control means comparing said actual speed and said actual turn angle signals with said desired speed rotation and desired turn angle information respectively for effecting any corrections to said first and second control signals respectively.

2. The improvement according to claim 1 wherein said first actuator means includes for each of said wheels an electric propulsion motor mechanically coupled to said wheel and a motor controller responsive to said first control signal for controlling the speed of rotation of said electric motor whereby said electric motor drives said wheel at said desired speed of rotation.

3. The improvement according to claim 1 wherein said second actuator means includes for each of said wheels an electric turn angle motor and a motor controller responsive to said second control signal for controlling the angle of rotation of said electric motor whereby said electric motor drives said wheel to said desired turn angle.

4. The improvement according to claim 1 including means for generating a speed selection signal representing the desired speed for the vehicle, wherein said control means is responsive to said speed selection signal and said selected mode desired relative speed of rotation information for generating a speed reference signal representing the desired speed of rotation for each of said wheels, and wherein said control means generates said first control signal for each of said wheels as the integral of the difference between said speed reference signal and said actual speed signal for the associated one of said wheels.

5. The improvement according to claim 4 wherein said memory means stores said desired relative speed of rotation information as data for each of said wheels for each one of a plurality of speed selection signals representing predetermined speeds of the vehicle and wherein said control means is responsive to each one of said speed selection signals for obtaining the associated data from said memory means and multiplying the associated data by the value of the predetermined speed to generate said speed reference signals.

6. The improvement according to claim 1 including means for generating a steering position signal representing the desired turn angle of the vehicle, wherein said control means is responsive to said steering position signal and said selected mode desired turn angle information for each of said wheels for generating a steering position reference signal representing the desired turn angle for each of said wheels, and wherein said control means generates said second control signal for each of said wheels as the integral of the difference between said steering position reference signal and said actual wheel position signal for the associated one of said wheels.

7. The improvement according to claim 6 wherein said memory means stores said desired turn angle information as data for each of said wheels for each one of a plurality of steering position signals representing predetermined turn angles for the vehicle and wherein said control means is responsive to each one of said steering position signals for obtaining the associated data from said memory means and multiplying the associated data by the value of the predetermined turn angle to generate said steering position reference signals.

8. The improvement according to claim 6 wherein said control means is responsive to said steering position signal and said actual wheel position signal for one of said wheels selected as a master wheel for generating said second control signal for said master wheel and wherein said control means is responsive to said actual wheel position signal for said master wheel and said selected mode desired turn angle information for each of said wheels for generating a steering postion reference signal representing the desired turn angle for each of said wheels other than said master wheel.

* * * * *

UNITED STATES PATENT AND TRADEMARK OFFICE
CERTIFICATE OF CORRECTION

PATENT NO. : 4,237,994
DATED : December 9, 1980
INVENTOR(S) : Bruce J. McColl

It is certified that error appears in the above—identified patent and that said Letters Patent are hereby corrected as shown below:

Column 7, line 15 "24" should be --204 --.

Column 7, line 51 "Sw" should be -- SW --.

Column 7, line 51 "128" should be -- 218 --.

Column 12, line 50 "applied" should be -- applies --.

Signed and Sealed this

Twenty-first Day of April 1981

[SEAL]

Attest:

RENE D. TEGTMEYER

Attesting Officer     Acting Commissioner of Patents and Trademarks